Figure 1:
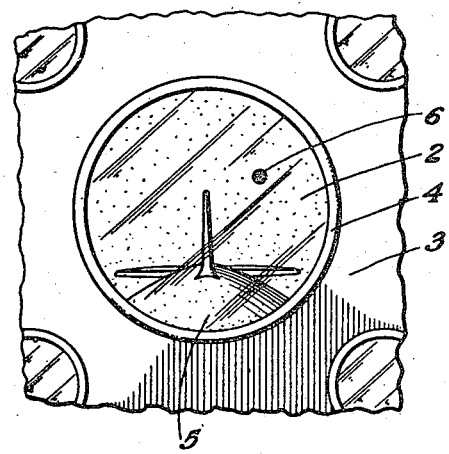

Jan. 7, 1947.   W. C. ROBINETTE   2,413,785
GUN TRAIN INDICATION FOR AIRPLANE PILOTS
Filed March 11, 1940

INVENTOR
WILLARD C. ROBINETTE
BY
ATTORNEY

Patented Jan. 7, 1947

2,413,785

UNITED STATES PATENT OFFICE 2,413,785

GUN TRAIN INDICATION FOR AIRPLANE PILOTS

Willard C. Robinette, Pasadena, Calif.

Application March 11, 1940, Serial No. 323,489

3 Claims. (Cl. 177—311)

My invention relates to a system for telemetering motion and has particular reference to a device for reproducing at a remote point the motion of the line of sight of a gun relative to the structure upon which the gun is mounted.

Many circumstances arise in industries and other activities in which it is desirable or necessary to reproduce at a remote point the motion of an object which is moved either manually or mechanically. For example, in warfare, it is often desirable to provide such a remote indicating or telemetering system for indicating the positions and movements of guns. Such a problem arises in aerial warfare and particularly on bombing and similar types of planes where the pilot's rearward vision is obscured by the fuselage of the plane.

Planes of this type usually carry a machine gun located near the center of the fuselage and mounted to fire generally upward and toward the rear of the plane. This gun is employed to combat enemy planes attacking from the rear and is highly effective for this purpose until the attacking plane maneuvers into such position that the tail structure of the attacked plane is between the machine gun and its target, at which time the gun becomes useless. When this condition obtains, it is necessary for the pilot of the attacked plane to so change the course of the plane as to move the tail structure out of the line of fire of the rear gun.

Since the pilot of the plane has his rearward vision so obscured by the fuselage of his own plane as to make it impossible for him to see the attacking plane, some means is needed which will continually inform him as to the location of the attacking plane relative to the tail structure of the attacked plane. This may be readily accomplished by keeping the pilot informed through the use of a telemetering system of the relative motion between the line of sight of the rear gun and the tail structure, since in combat this line of sight will always be directed by the rear gunner at the attacking plane.

Such a telemetering system must conform to certain peculiar requirements imposed by the complex construction of the plane. Mechanical interconnection between the gun and the pilot's compartment is unsatisfactory because of the remote location of the rear gun and the numerous obstructions between the gun and the pilot's compartment. Furthermore, mechanical linkages and the like are liable to get out of order and jam so as to seriously impair, if not prohibit, proper movement of the rear gun in its mounting. If electrical connections are employed they must operate at low voltage to keep the fire hazard and danger of injury to the crew at a minimum. The system must employ a minimum of moving parts, the mechanisms must be sufficiently rugged to withstand the shocks and vibrations resulting from combat maneuvers and the system must be capable of continuous and dependable operation since the lives of the plane and its crew may depend upon it.

It is accordingly an object of my invention to provide a telemetering system in which the indicating device has no moving parts to get out of order.

It is also an object of my invention to provide a telemetering system of the character set forth in which the indicating device comprises a cathode ray tube.

It is a still further object of my invention to provide a telemetering system of the character set forth in the preceding paragraphs in which the indicating device comprises a cathode ray tube cooperating with a means for changing the potential on the deflection anodes of the tube in accordance with the movement to be telemetered.

It is an additional object of my invention to provide a telemetering system of the character set forth which is particularly adapted to aircraft application and which employs a cathode ray tube as the indicating element and means responsive to movement of a remotely located gun about a pair of axes of movement for correspondingly deflecting the electron stream of the cathode ray tube.

Figure 2:
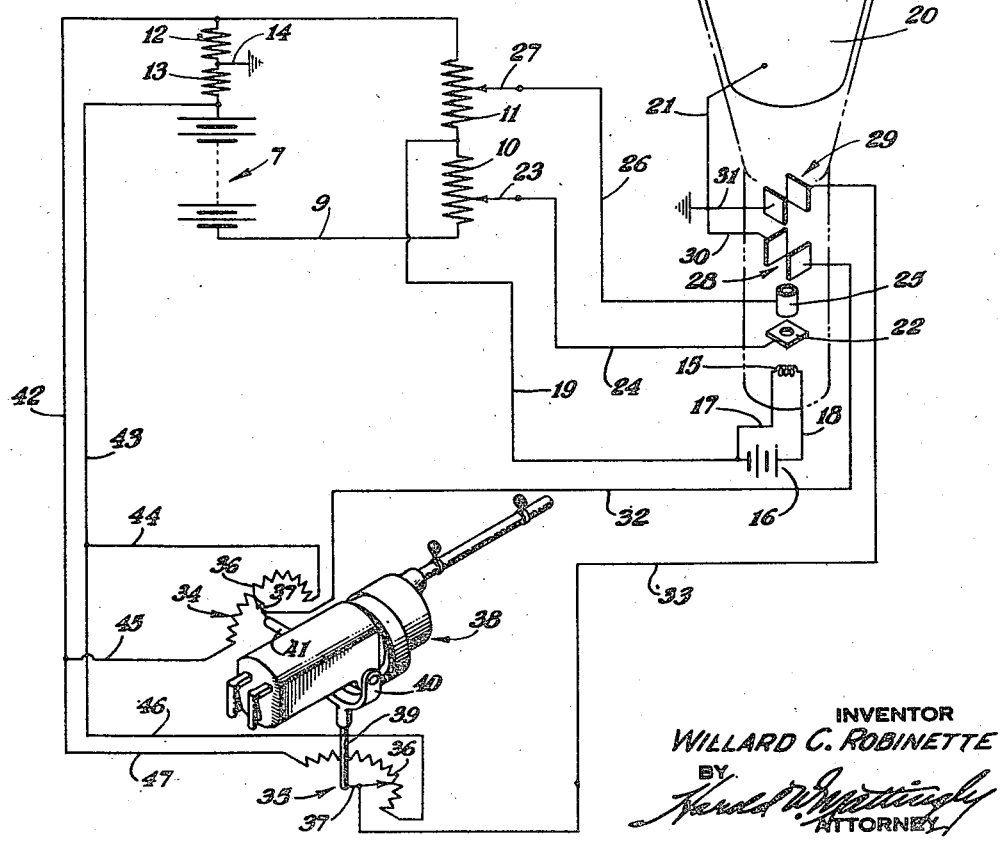

Other objects and advantages of my invention will be apparent from a study of the following specification, read in connection with the accompanying drawing, wherein:

Fig. 1 is a fragmentary front view of a section of instrument board in an air plane illustrating the appearance of the indicating element employed in the telemetering system of my invention when that system is employed for the purpose of informing a pilot of the direction of line of sight of a rear gun relative to the tail structure of the plane; and Fig. 2 is a schematic representation of the manner in which the indicating element is coupled to a gun mounted to rotate in both azimuth and elevation with respect to the airplane, without regard to the aspect of the latter with respect to the ground and illustrating diagrammatically the electrical connections employed therewith.

Referring to the drawing, I have illustrated therein an embodiment of the telemetering system of my invention which is particularly adapted to installation in air craft for the purpose of informing the pilot of such craft of the relative motion between the line of sight of a rear gun and the tail structure of the plane. The system as illustrated herein includes as an indicating element an electronic device capable of giving a sensible or visible indication comprising a cathode ray tube 1 which is of substantially conventional construction having a fluorescent screen 2. The cathode ray tube is preferably mounted behind an instrument board 3 of the plane and disposed in such position as to place the fluorescent screen 2 thereof substantially parallel to the surface of the instrument board 3 and exposed through a suitable aperture therein. Such boards are customarily positioned normal to the longitudinal axis of the airplane. If desired, an escutcheon plate 4 may be employed to improve the appearance of the assembly.

Upon the surface of the fluorescent screen 2 is painted or otherwise placed a figure 5 representing in perspective silhouette the appearance of the tail structure of the plane as viewed from the location of the rear gun, with the screen representing the gunner's field of view normal to the longitudinal axis of the aircraft, i. e., a vertical field when the airplane is in level flight. The cathode ray tube, when in operation, directs a stream of electrons upon the fluorescent screen 2, causing a luminous spot 6 to appear thereon.

In the system of my invention, the cathode ray tube is so coupled to the moving object as to cause the spot 6 to be moved over the surface of the fluorescent screen 2 in accordance with the movement of the object. In the particular form of the device shown, the luminous spot 6 is caused to move over the surface of the screen in accordance with the movement of the line of sight of the rear gun relative to the tail structure of the plane, which rear gun is ordinarily mounted in the upper portion of the fuselage and substantially midway of the length thereof.

In this connection I am departing radically from that which has up to this time been recognized as conventional practice in the use of cathode ray tubes. Heretofore it has been considered impossible to so operate a cathode ray tube as to cause a luminous spot 6 to remain substantially stationary on the fluorescent screen 2 for the reason that the energy of the electron stream striking the fluorescent screen 2 has been found to be sufficient to cause burning of the screen and the resultant disabling of that portion of the screen upon which the spot is allowed to remain for any appreciable length of time.

I have found, however, that this burning may be prevented by reducing the energy of the electron stream to a point below a safe maximum limit. This may be done by either reducing the total quantity of electrons directed against the screen within a predetermined period of time or by increasing the area of the spot to the point where the concentration of electron energy on the surface of the screen reduces the rate of application of energy thereto to a point below the burning point of the screen. I have found that a suitable compromise between these two operating conditions may be achieved by both reducing the quantity of electrons (the intensity of the electron beam) and by increasing the area of the luminous spot. If both of these changes are properly made, there results a luminous spot of sufficient size and intensity to be readily observable by a person looking at the fluorescent screen while the distribution of energy over the surface of the fluorescent screen may, under those conditions, be kept below the burning point of the screen.

The cathode ray tube 1 may be actuated by a suitable source of power 7, illustrated herein as comprising a battery, it being understood, however, that any other suitable source of direct current may be employed. The battery 7 has connected to opposite polarities thereof by means of conductors 8 and 9 a voltage dividing network comprising potentiometers 10 and 11 and fixed resistances 12 and 13, these devices being all connected in series across the battery and the point of common connection between the fixed resistors 12 and 13 being grounded to the framework of the plane as by a conductor 14.

The cathode ray tube 1 includes a cathode 15 adapted to be heated to a temperature sufficient to cause it to emit electrons as by a battery 16 coupled thereto by means of conductors 17 and 18. The cathode 15 is also preferably connected as by means of a conductor 19 to a point in the voltage divider network common to the potentiometers 10 and 11. Electrons emitted by the cathode 15 are attracted toward the fluorescent screen 2 and accelerated in their movement by means of an accelerating anode 20 which is connected by means of a conductor 21 to the framework of the plane. It will be observed that this manner of connection places the accelerating anode 20 at ground potential while the cathode 15 is maintained at a substantial negative potential relative to ground.

The quantity of electrons emitted by the cathode 15 during a predetermined period of time is controlled by a control grid 22 which is maintained at a negative potential relative to the cathode 15 as by connecting it to the movable arm portion 23 of the potentiometer 10 as by means of a conductor 24. The potentiometer 10 permits the potential on the control grid 22 to be varied from nothing relative to the cathode 15 at which time great quantities of electrons are emitted by the cathode 15 to a potential substantially negative relative to the cathode at which time a minimum quanity of electrons is emitted.

The stream of electrons is compacted or focused by means of a focusing anode 25 which is maintained at a positive potential relative to the cathode 15 as by means of a conductor 26 connected to the movable arm portion 27 of the potentiometer 11. Adjustable movement of the potentiometer 11 permits variation of the potential applied to the focusing anode 25 to permit control of the degree of compacting effected on the stream of electrons so as to thus control the size of the luminous spot 6 formed on the fluorescent screen by impact of the electron stream therewith.

The cathode ray tube, in addition to the aforementioned elements, includes a spot moving means which comprises two pairs of electrical potential responsive means or deflection anodes 28 and 29. These anodes are disposed on opposite sides of the electron stream and are arranged at right angles to each other so that potential applied to one pair of deflection anodes 29 will cause a deflection of the luminous spot 6 over the screen in azimuth while a change in potential upon the other pair of deflection anodes 28 will cause a movement of the spot 6 over the screen in elevation, with respect to the silhouette 5.

One of each of the pair of deflection anodes 28 and 29 is connected to ground as by means of conductors 30 and 31 while the others of each pair are connected by means of conductors 32 and 33 to the transmitting element of my telemetering system comprising motion responsive devices 34 and 35 which are adapted to vary the characteristics of the electrical circuit in which the deflection anodes 28 and 29 are included, the variation in this case consisting of variations in the potential applied to the deflection anodes 28 and 29 in accordance with movement of the object whose motion is to be telemetered. While I have illustrated herein a cathode ray tube employing deflection anodes of the electrostatic type, it is to be understood that the term deflection anode as used herein is intended to be used also to mean the well known electromagnetic type of deflection members commonly employed with cathode ray tubes.

The motion responsive devices 34 and 35 are illustrated herein as comprising potentiometers, each of which includes a resistance strip 36 over which is moved a movable contacting arm 37. One of the arms 37 is connected to the mounting device for a machine gun 38 which may be located at the rear gunner's cockpit of the plane in such manner as to be responsive to movement of the gun 38 in elevation. Correspondingly, the arm 37 of the other potentiometer is coupled to the mounting for the gun 38 so as to be responsive to movement of the gun in azimuth. This may be accomplished in any desired manner, the form shown herein, for purely illustrative purposes, comprising a vertically extending shaft member 39 which bears upon its upper end a yoke 40 between which is extended a spindle 41 secured to the machine gun 38. Movement of the gun 38 in elevation will result in movement of the spindle 41 and the movable arm 37 of the potentiometer 34 is accordingly connected to the spindle. The vertically extending shaft 39 is journaled for rotation so as to permit movement of the gun 38 in azimuth and be moved therewith and accordingly the movable arm 37 of the potentiometer 35 is connected to the shaft 39.

The aforementioned control conductors 32 and 33 are connected to the movable arms 37 so that a change in the potential applied to these arms will cause a corresponding change of potential which is applied to the deflection anodes. Such change in potential may be accomplished by extending a pair of conductors 42 and 43 connected, respectively, to opposite ends of the fixed resistors 12 and 13, the resistance portions 36 of the potentiometers 34 and 35 being connected in parallel with the conductors 42 and 43 as by means of conductors 44—45 and 46—47.

It will be observed that with the form of connection shown one end of each of the resistance portions of the potentiometers is maintained at a predetermined negative potential relative to ground while the opposite end of these resistance portions is maintained at a corresponding positive potential relative to ground. It will also be noted that since one of each of the pair of deflection anodes 28 and 29 is connected to ground, movement of the potentiometer arm portions from one end of the resistance strip to the other will cause a corresponding deflection of the luminous spot 6 from one side of a neutral or central position to the other side thereof. The magnitude of such deflection of the luminous spot 6 is controlled by the potential which is impressed upon the conductors 42 and 43 and this potential is accordingly so adjusted as to cause the movement of the spot 6 on screen 2 relative to the silhouette 5 to be in exact accordance with the movement of the line of sight of the gun 38 relative to the actual tail structure of the plane.

The device may be placed in operation by completing the above described circuits in any suitable manner as by means of switches (not shown herein). Whenever the rear gunner aims the gun 38 at an attacking plane, the spot 6 will be caused to assume a position on the fluorescent screen relative to the silhouette 5 which exactly represents the true line of sight of the rear gun relative to the tail structure of the plane so that the pilot may ascertain, by observing the relative positions of the luminous spot 6 and the silhouette 5, the location of an enemy plane attacking from the rear. Whenever the luminous spot 6 approaches the silhouette 5 so closely as to indicate that the rear gunner will soon be prevented from shooting at the attacking enemy plane for the reason that such attacking plane is hiding behind the tail structure, the pilot may change his course in such manner as to move the tail structure of his plane out of the line of fire.

It will thus be seen that the pilot of an air craft equipped with a telemetering system of my invention may, at all times, be apprised of the location of an attacking plane by the rear gunner merely keeping his gun aimed at such attacking plane.

It will furthermore be observed that there are substantially no moving parts employed in the system of my invention, the only moving parts which are employed being those necessary to interpret the motion of the object and to convert such motion into changes of electrical potential.

It will also be observed that there are no moving parts whatever employed in the indicating portion of my telemetering system and that all of the parts including the cathode ray tube may be of sufficiently sturdy construction to withstand the shocks and vibrations resulting from the combat maneuvers.

Attention is called to the fact that by the grounding of the electrical system at the point of common connection between the resistors 12 and 13, the conductors 42—43 and 32—33 which are extended from the instrument board to the rear cockpit may be operated at a low and safe potential so as to reduce the fire hazard and element of danger of electrical shock.

While I have shown and described the preferred embodiment of my invention, I do not desire to be limited to any of the details of construction shown or described herein, except as defined in the appended claims.

I claim:

1. In combination with a gun mounted on an airplane to rotate in azimuth and elevation, said gun having a possible line of sight including a portion of said airplane, a cathode ray tube mounted on said airplane in a position remote from said gun, said tube having a screen and means for producing a beam of electrons directed to form a luminous spot on said screen, a representation of said airplane portion as seen from said gun location in an elevational view field forming a part of said screen area, deflecting means positioned to control said beam in azimuth and elevation with respect to said representation, and means mounted on said gun for translating movements of said gun in azimuth and elevation into electrical energy applicable to said deflecting means in proper sense to move said beam in relation to said representation in accordance with movement of said gun with respect to the represented portion.

2. Apparatus in accordance with claim 1 wherein said cathode ray tube is mounted on the instrument board of said airplane with the screen thereof facing the position of the airplane pilot, and with said screen positioned normal to the longitudinal axis of said airplane.

3. Apparatus in accordance with claim 1 wherein spot size controlling means are provided cooperating with said beam to widen the luminous spot on said screen to an area wherein the electron density is too low to burn said screen during continuous impact of said beam thereon.

WILLARD C. ROBINETTE.